United States Patent [19]

Ando

[11] Patent Number: 4,767,068
[45] Date of Patent: Aug. 30, 1988

[54] DOMESTIC ICE SHAVER

[75] Inventor: Toshio Ando, Kuwana, Japan

[73] Assignee: Chubu Industries, Inc., Mie, Japan

[21] Appl. No.: 56,463

[22] Filed: May 29, 1987

[30] Foreign Application Priority Data

Jun. 10, 1986 [JP] Japan ............................. 61-88215[U]
Feb. 26, 1987 [JP] Japan ............................. 62-27617[U]
Mar. 6, 1987 [JP] Japan ............................. 62-33570[U]
Mar. 6, 1987 [JP] Japan ............................. 62-33571[U]

[51] Int. Cl.⁴ ............................................. B02C 18/00
[52] U.S. Cl. ........................................ 241/84; 83/403;
83/582; 83/700; 144/174; 144/175; 241/37.5;
241/95; 241/285 A; 241/290
[58] Field of Search .................... 241/89.3, 89.4, 84,
241/95, 101.2, 286, 290, 92, 246, 248, 257 R,
261.1, DIG. 17, 37.5, 285 R, 285 A, 277;
83/699, 700, 582, 403, 411 R, 425; 144/174, 175

[56] References Cited

U.S. PATENT DOCUMENTS

| | | | |
|---|---|---|---|
| 2,525,650 | 10/1950 | Clark et al. | 241/290 |
| 3,981,337 | 9/1976 | Sundström | 241/92 X |
| 4,055,099 | 10/1977 | Mitsubayashi | 241/DIG. 17 X |
| 4,216,917 | 8/1980 | Clare et al. | 241/92 X |
| 4,565,329 | 1/1986 | Himi | 241/DIG. 17 X |
| 4,588,135 | 5/1986 | Himi | 241/95 X |
| 4,589,599 | 5/1986 | Williams | 241/DIG. 17 X |

Primary Examiner—P. W. Echols
Assistant Examiner—Joseph M. Gorski
Attorney, Agent, or Firm—Felfe & Lynch

[57] ABSTRACT

A domestic ice shaver comprises a box-like base frame unit having a top surface beyond which a drive shaft rotated by a built-in motor protrudes, a shaver case unit mounted on the base frame unit and having a shaved ice piece discharge port to which a shaving blade faces, a rotary blade unit fixed to the upper end of the drive shaft within the shaver case unit and having, on its top, a cylindrical hopper, and a cover unit mounted to the shaver case unit to cover an upper portion thereof and having a central openable lid. There is provided on the outer surface of the shaver case unit a shaving blade block detachably disposed rearwardly of the shaved ice piece discharged port. The shaving blade block has a front edge portion mounted with the shaving blade confronting the shaved ice piece discharge port.

6 Claims, 11 Drawing Sheets

DOMESTIC ICE SHAVER

BACKGROUND OF THE INVENTION

1. Field of the Invention

This invention relates to compact domestic ice shavers.

2. Description of the Prior Art

Conventionally, a typical example of this type of ice shaver has been known as disclosed in U.S. Pat. No. 4,565,329 assigned to the assignee of the present application. The prior art example comprises a box-like base frame unit having the top surface beyond which a drive shaft rotated by a built-in motor protrudes, a shaver case unit mounted on the base frame unit and having a shaved ice piece discharge port to which a shaving blade faces, a rotary blade unit fixed to the upper end of the drive shaft within the case unit and having, on its top, a cylindrical hopper, and a cover unit mounted to the shaver case unit to cover an upper portion thereof and having a central openable lid.

In the prior art example, however, the shaving blade is secured to a support seat on the back surface of the shaver case unit by means of screws, thus raising problems that the shaver must be disassembled into individual units each time the shaving blade is exchanged, resulting in a troublesome exchange operation and that it is difficult to maintain parallelism between the surface of the shaver case unit and a cutting edge of the shaving blade and to adjust the amount of protrusion of the cutting edge.

Further, in the aforementioned U.S. patent, danger can be prevented by allowing the rotary blade unit to be rotated only when an auxiliary switch inserted in a motor drive circuit is turned on simultaneously with closure of the openable lid provided for the cover unit and a main switch in the motor drive circuit is then turned on manually.

However, the main switch can be on/off operated externally and this arises another problem that the main switch can not fulfil its danger preventive role if, without turning off the main switch even in the event that the rotary blade unit is not reguired to be rotated, the openable lid is inadvertently closed by erroneously recognizing that the main switch had been turned off and the rotary blade unit is consequently rotated.

Further, the prior art example of the aforementioned U.S. patent is disadvantageous in that when each unit is internally contaminated in use and the shaver is desired to be disassembled for removal of contaminants, special tools for disassembling and reassembling are needed because of structural complexity of the shaver.

SUMMARY OF THE INVENTION

An object of this invention is to provide an ice shaver which can solve the problems encountered in the prior art ice shaver by facilitating exchange operation of a shaving blade and adjustment of the protrusion of a cutting edge of the shaving blade as well as by insuring maintenance of parallelism between the surface of a shaver case unit and the cutting edge of the shaving blade.

According to the present invention, the above object can be accomplished by providing an ice shaver of the aforementioned conventionally known type wherein there are provided on an outer surface of the shaver case unit a shaving blade support disposed rearwardly of the shaved ice piece discharge port and having a threaded hole for an adjusting screw and an engaging projection strip disposed rearwardly of the shaving blade support and having an engaging recess formed in its top, and a shaving blade block is provided which has a front edge portion mounted with the shaving blade and an opening through which the adjusting screw passes so as to be screwed into the threaded hole, the shaving blade block having grooves and a tag which are respectively fitted on the engaging projection strip and fitted in the engaging recess when the adjusting screw is tightened and having a spring member, interposed between a front bottom surface of the shaving blade block and an outer surface of the shaving blade support, for upwardly urging the shaving blade block. With this construction, when the shaving blade is desired to be exchanged with a new one, the shaving blade block can be removed by loosening and withdrawing the adjusting screw out of the threaded hole in the shaver case unit and then the removed shaving blade block can be exchanged with a new one. When the shaving blade is desired to be largely protruded into the shaved ice piece discharge port, the adjusting screw can be further tightened to advance the shaving blade block, that is, the shaving blade in opposition to a reaction force by the spring member. Conversely, when the shaving blade is desired to be retreated, the adjusting screw can be loosened to retreat the shaving blade block or the shaving blade under the influence of a push force of the spring member. For the above procedures, any troublesome operation such as conventional disassembly of the shaver into individual units is not required and nobody fails to readily perform mounting, removal and positional adjustment of the shaving blade.

Another object of this invention is to provide an ice shaver capable of securely stopping rotation of the rotary blade unit to prevent the operator or user from suffering injuries ascribable to the fact that the rotary blade unit of the prior art ice shaver will rotate even with the openable lid opened.

This object can be accomplished by an embodiment of the ice shaver of the invention constructed as above wherein a swingable device having a ring surrounding the outer circumferential periphery of the hopper is mounted at its edge portion to the inner surface of the cover unit through a hinge mechanism, urging pawls extending vertically from the inner circumferential edge of the openable lid pivotally mounted to the cover unit engage, at their lower ends, the upper surface of the ring, and a switch operating lever normally biased upwards by a spring member and having its upper end engaging the free end of the swingable device is vertically movably mounted to an inner vertical portion of the cover unit, whereby when the operable lid remaining closed is manually depressed by hand, the switch operating lever is lowered by the swingable device to turn on a switch for the motor. In this embodiment constructed as above, when the openable lid is released from the depression and recovers normal closure, the switch operating lever is automatically raised under the influence of a push force of the spring member to turn off the motor switch. This condition of the switch operating lever remains unchanged until the lid is subsequently closed, thus preventing the rotary blade unit from rotating.

Still another object of this invention is to provide an ice shaver capable of being readily disassembled into individual units and of permitting easy reassembling of the individual units without resort to special tools, in contrast to the prior art ice shaver, in the event that the individual units are internally contaminated.

This object can be accomplished by an embodiment of the ice shaver of the invention constructed as above wherein the base frame unit, shaver case unit, rotary blade unit and cover unit are structurally independent of each other and wherein the base frame unit has a circular support seat which is concentric with the drive shaft and which is provided, on its outer circumferential surface, with a plurality of lugs, the shaver case unit has, at its bottom, a skirt which is concentric with the drive shaft and which surrounds the support seat, the inner circumferential surface of the skirt being provided with the same number of outwardly extending engaging members as the lugs which are brought into engagement with the lugs when the shaver case unit is turned, the shaver case unit further having, at its upper front peripheral edge, a lug and at its rear portion a deflectable latch, the rotary blade unit has a boss in which a threaded rod for meshing engagement with a threaded hole in the upper end of the drive shaft is vertically embedded, and the cover unit has, at its lower circumferential edge, a lug and a latch which are engageable with the lug and latch of the shaver case unit. In this embodiment constructed as above, when the engaging members of the shaver case unit are brought into engagement with the lugs of the base frame unit by turning the skirt of the shaver case unit about the support seat of the base frame unit, these units can be coupled together. Conversely, by disengaging these lugs and engaging members, both the units can be separated. The rotary blade unit can be coupled to the drive shaft by tightening the threaded rod of the rotary blade unit into the threaded hole in the drive shaft and conversely, the rotary blade unit can be separated from the drive shaft by loosening and withdrawing the threaded rod. The cover unit can be coupled to the shaver case unit by bringing the lug and latch of the cover unit into engagement with those of the shaver case unit and conversely, by disengaging these lugs and latches, both the units can be separated. The above operations can be carried out readily by an inexpert user without using any special tools.

In a further embodiment in relation to the last embodiment, a cam is formed on the lower edge of the skirt, an opening is formed in the top of the base frame unit on a path of movement of the cam, and a click biased upwards by a spring is vertically movably supported in the opening, whereby when the upper end of the click engages the cam so as to be lowered, the lower end of the click abuts against a stopper carried on a gear for driving the drive shaft disposed within the base frame unit. With this embodiment constructed as above, the drive shaft can continue to stop turning when the rotary blade unit is mounted or dismounted and the rotary blade unit can be handled readily for mounting or dismounting. The stoppage of turning of the drive shaft can automatically be done by simply turning the skirt of the shaver case unit about the support seat of the base frame unit to cause the cam on the lower edge of the skirt to depress the click provided for the base frame unit.

DESCRIPTION OF THE PREFERRED EMBODIMENTS

Figure 1:
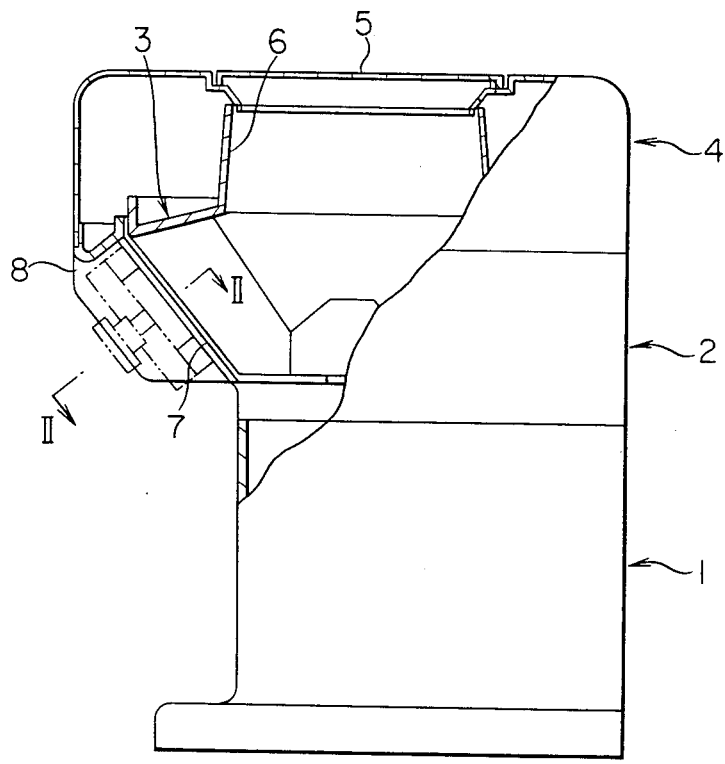
FIG. 1 is a front view, partly exploded, showing a domestic ice shaver according to a first embodiment of the invention.

Referring now to FIGS. 1 to 7, a first embodiment of the invention will be described. The first embodiment is directed to a compact domestic ice shaver of a about 20 to 25 cm height comprising a box-like base frame unit 1, an upwardly divergently tapered shaver case unit 2 which is disposed on the base frame unit 1 and in which a rotary blade unit 3 having a plurality of blades that rotate in substantial contact relationship with the inner circumferential surface of the shaver case unit 2 is fixed to a main shaft (not shown) driven by a motor and protruding through the bottom of the shaver case unit 2, and a hopper 6, mounted on the rotary blade unit 3, for supplying cubic ice blocks to the shaver case unit 2. Disposed above the shaver case unit 2 is a cover unit 4 having, at its center portion, an openable lid 5.

Figure 2:
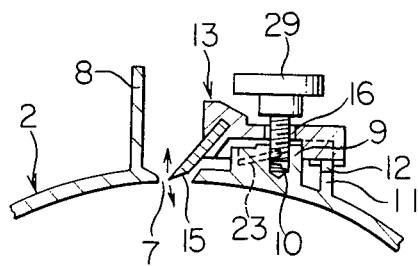
FIG. 2 is a fragmentary sectional view taken on the line II—II of FIG. 1 and as seen in the direction of arrow.

As shown in FIGS. 1 and 2, there are provided on the outer surface of the shaver case unit 2 a shaved ice piece discharge port 7 in the form of a slit opened forwards or frontwards, an outwardly protruding guide plate 8 disposed frontwardly (lefthand side in FIG. 2) of the discharge port 7, and a shaving blade support 9 disposed rearwardly (righthand side in FIG. 2) of the discharge port 7. The support 9 is formed with a threaded hole 10 for an adjusting screw 29, and an engaging projection strip 11, outwardly protruding, is provided rearwardly of the support 9. The engaging projection strip is parallel to the discharge port 7 and is formed with a middle engaging recess 12.

Figure 3:
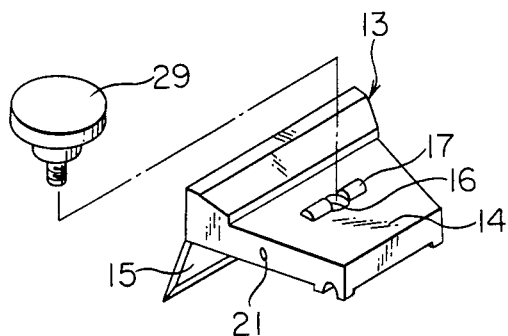
FIG. 3 is a perspective view showing a part of FIG. 2 in partly exploded form as seen from above.
Figure 4:
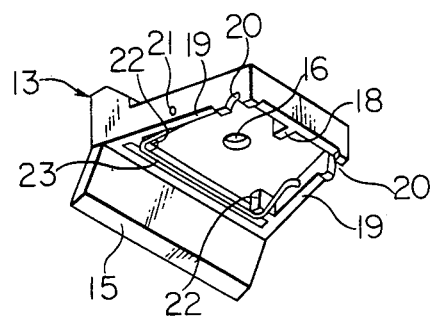
FIG. 4 is a perspective view showing a part of FIG. 3 as seen from below.
Figure 5A:
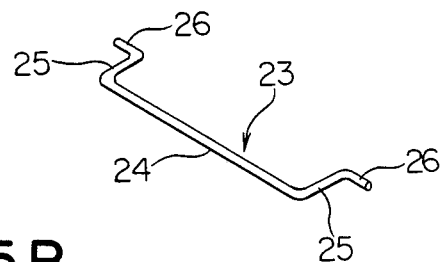
FIG. 5A is a perspective view of a spring member seen in FIG. 2.
Figure 5B:
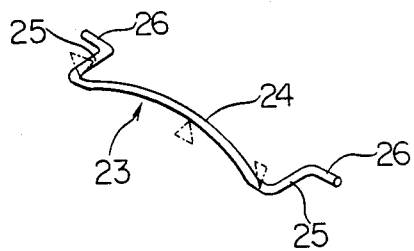
FIG. 5B is a perspective view showing the spring member of FIG. 5A as applied with a depression force.
Figure 6:
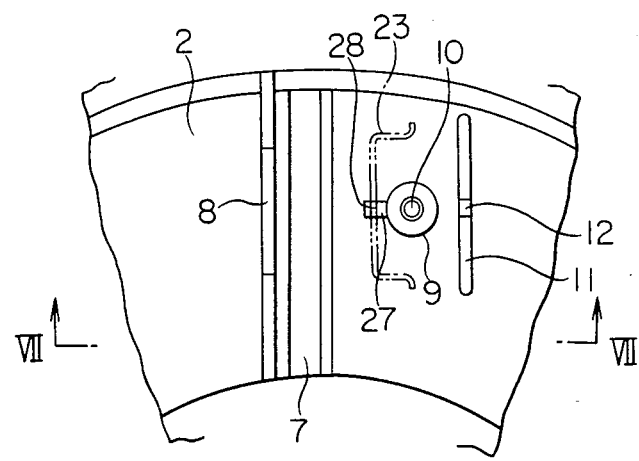
FIG. 6 is a top view of the FIG. 2 part as removed of a blade block.
Figure 7:
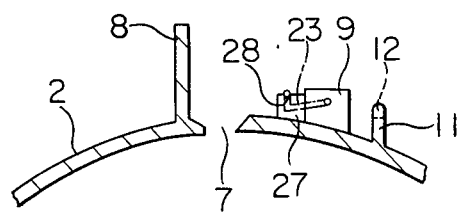
FIG. 7 is a sectional view taken on the line VII—VII of FIG. 6 and as seen in a direction of arrow.

FIGS. 3 and 4 illustrate, in perspective view form, a shaving blade block 13 made of, for example, synthetic resin having a frustum mount plate 14 which is recessed, at the bottom, to form a box-like cavity for accommodating the support 9. The mount plate 14 has a front edge portion to which a shaving blade 15 protruding obliquely forwardly is fixedly mounted during forging of the mount plate 14, and a center opening 16. On the outer surface of the mount plate 14, strip raises 17 are provided on either side of the opening 16. When tightened, the adjusting screw 29 will come into contact with the stripe raises 17. A projecting edge 19 contours the box-like cavity in the bottom of the mount plate 14. There are formed in the projecting edge a pair of engaging grooves 20 in which the engaging projection strip 11 is pivotally fitted, and a positioning tag 18 to be fitted in the engaging recess 12 extends forwards or frontwards from the middle of inner rear surface of the projecting edge 19. The projecting edge 19 is further formed with a pair of receiving holes 21 in which spring member 23 to be described later is fitted, and with a pair of seats 22 that lie on opposite ends of the bottom near the front edge portion for receiving the spring member 23.

The spring member 23 is of a rod configuration and has a connecting portion 24 having opposite ends from which resilient legs 25 extend perpendicularly, the resilient legs 25 terminating in outwardly bent engaging legs 26, thus completing a spring member of a substantial ⊏ shape. The spring member 23 can be mounted to the shaving blade block 13 by placing the resilient legs 25 along the projecting edge 19 on the bottom of the mount plate 14 and fitting the engaging legs 26 in the spring receiving holes 21.

The shaving blade support 9 has a boss 27 which extends frontwards from the wall surrounding the threaded hole 10, and the longitudinal middle of the connecting portion 24 of the spring member 23 will rest on the top of the boss 27. Preferably, in the top of the boss 27, a shallow engaging recess 28 may be formed in which the middle of the connecting portion 24 is fitted.

In the above-described embodiment, the ⊏ shape spring member 23 is connected to the shaving blade block 13 by placing in the cavity thereof the resilient legs 25 such that they extends along opposite inner side surfaces of the projecting edge 19 of shaving blade block 13 mounted with the forward or frontward shaving blade 15, the positioning tag 18 formed at the middle of inner rear surface of the projecting edge 19 of shaving blade block 13 is fitted in the engaging recess 12 in the engaging projection strip 11 of the shaver case unit 2, and the engaging grooves 20 are fitted on the engaging projection strip 11, whereby the cutting edge of the shaving blade 15 carried on the block 13 can be pivotally held in position so as to confront the shaved ice piece discharge port 7. The connecting portion 24 of the ⊏ shape spring member 23 mounted on the bottom of the shaving blade block 13 resiliently rests on the top of the engaging recess 28 in the boss 27 of the shaving blade support 9 provided on the outer surface of the shaver case unit 2. When the adjusting screw 29 is tightened or screwed into the threaded hole 10 in the shaving blade support 9 through the opening 16, the block 13 is interlocked with the shaving blade support 9. By adjusting the amount of meshing engagement of the adjusting screw 29, the amount of protrusion of the cutting edge of the shaving blade 15 beyond the shaved ice piece discharge port 7 into the shaver case unit 2 can be adjusted, thereby making it possible to select desired and preferable roughness of shaved ice pieces. In addition, since all the above assemblage operations can conveniently be done outside the ice shaver, the shaving blade block can be dismounted for cleaning and remounted with extreme ease.

Figure 8:
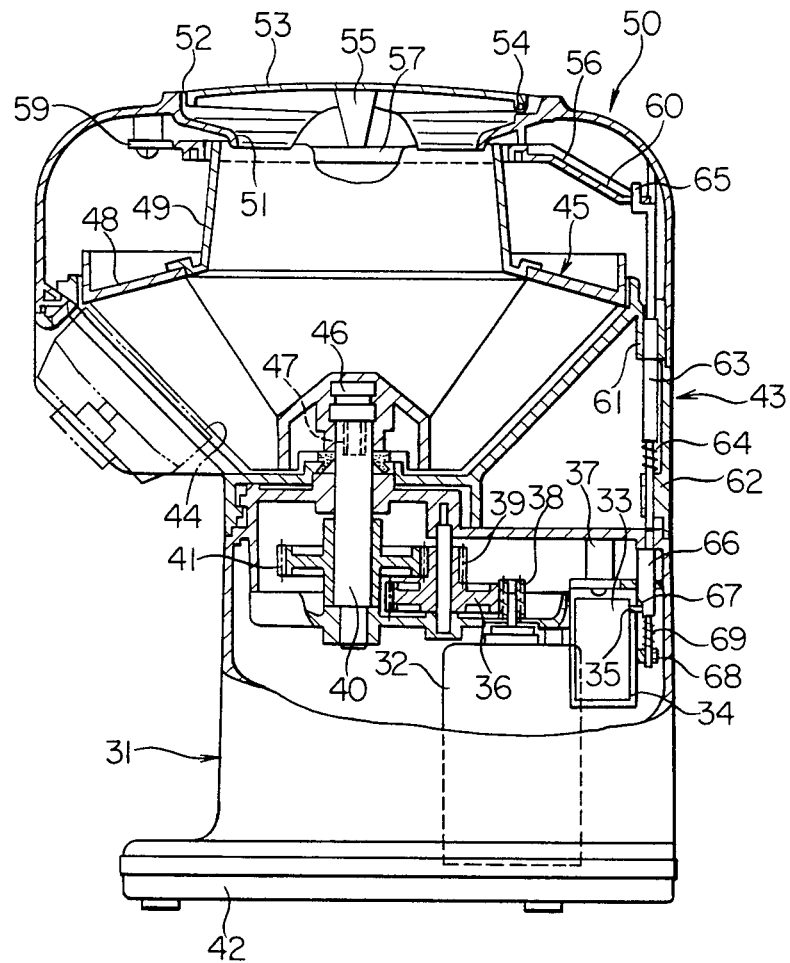
FIG. 8 is a front view, partly exploded, showing a domestic ice shaver according to a second embodiment of the invention.
Figure 9:
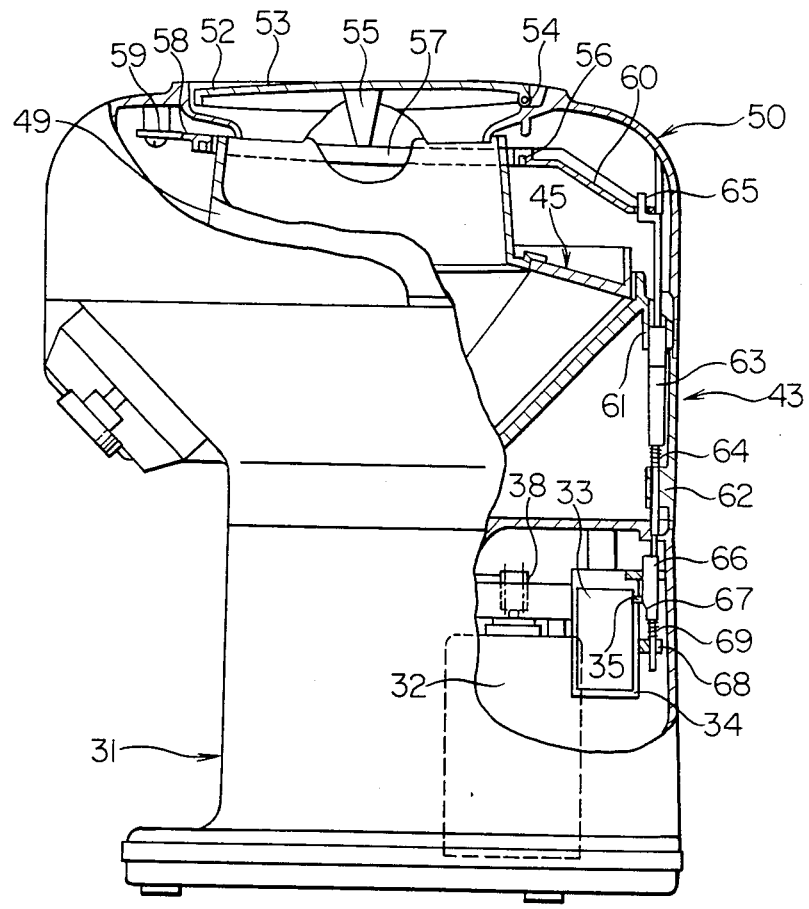
FIG. 9 is a partly exploded front view showing the FIG. 8 embodiment as operated for ice shaving.
Figure 10:
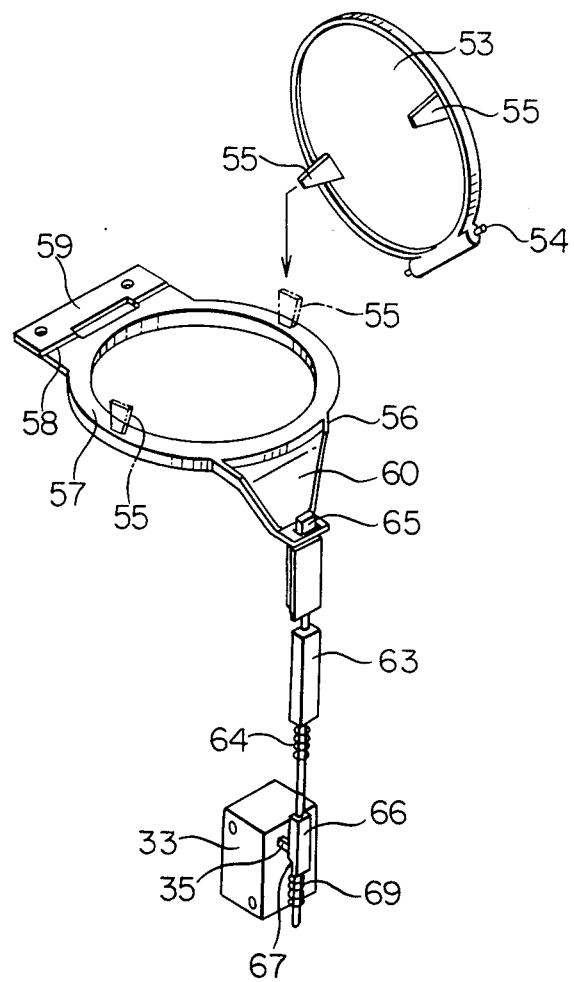
FIG. 10 is an exploded perspective view showing a part of the FIG. 8 embodiment.
Figure 11:
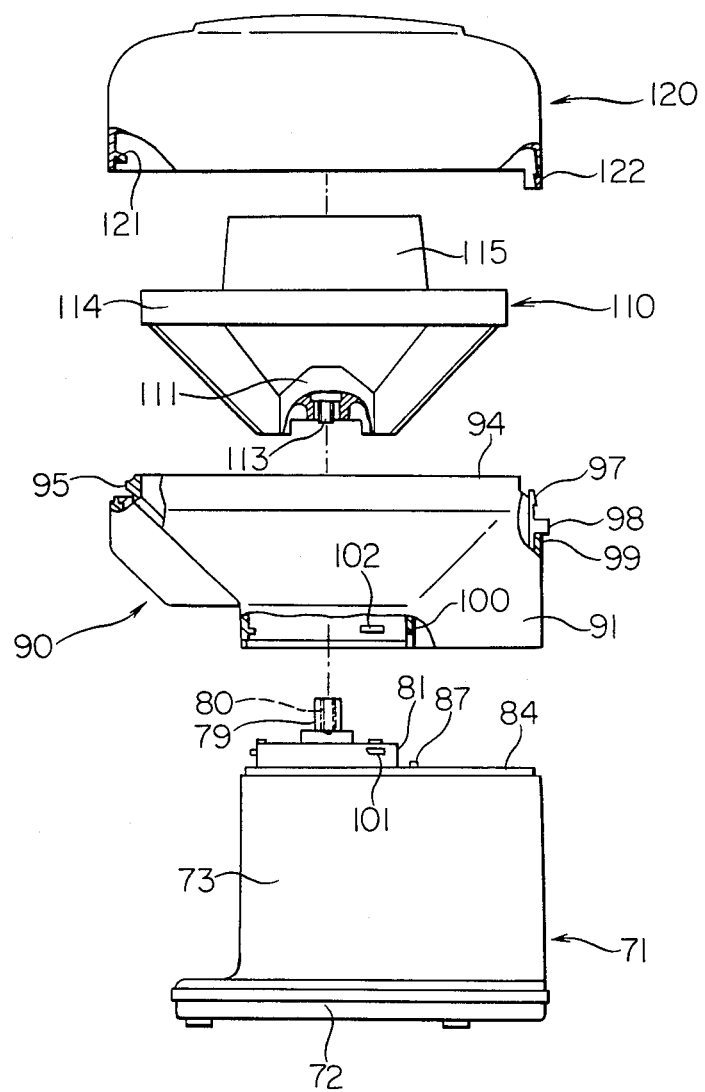
FIG. 11 is a front view of a domestic ice shaver according to a third embodiment of the invention disassembled into individual units as illustrated in partly exploded form.

Turning to FIGS. 8 to 10, there is illustrated a second embodiment of the invention comprising a base frame unit 31 made of, for example, synthetic resin, a shaver case unit 43 disposed on the base frame and having an inverted frusto-conical member and a shaved ice pieces discharge port to which a shaving blade 44 faces, and a rotary blade unit 45 having several blades for rotating ice blocks and rotatably mounted in the shaver case unit 43. Inside the base frame unit 31, a motor 32 is provided and a switch 33 inserted in a drive circuit for the motor 32 is accommodated in a switch case 34 which suspends from a ceiling of the base frame unit 31 by means of a fixture 37. The switch 33 has a button 35 which is in the proximity of the inner circumference of the base frame unit 31.

An output shaft of the motor 32 carries a pinion 38 in mesh with a large-diameter intermediate gear 36 and a large-diameter gear 41 carried on a drive shaft 40 is in mesh with a small-diameter gear 39 integral with the intermediate gear 36. The base frame unit 31 has a bottom opening which is covered with a bottom plate 42.

The drive shaft 40 passing through the shaver case unit 43 is rotatably supported and connected to the rotary blade unit 45 by tightening a screw 47, provided in a boss 46 integral with a lower end of the rotary blade unit 45, into the upper end of the drive shaft 40. The rotary blade unit 45 has an integrally formed annular plate 48 which overlies upper ends of the blades, and a frusto-conical hopper 49 is secured to the wall of a center hole of the annular plate 48.

A cover unit 50 covers the shaver case unit 43, except for its portion mounting the shaving blade 44, and the hopper 49 has a feed port 52 with a funnel-like guide 51 confronting an ice block charge port of the hopper 49. An openable lid 53 covering the feed port 52 is pivotally mounted to a rear portion thereof by means of a shaft 54 and has, at diametrally opposite sides on the bottom, a pair of urging pawls 55 which can freely pass through a small center opening of the guide 51.

The upper circumferential edge of the hopper 49 is surrounded by a ring 57 of swingable device contactless relationship therewith. As best seen in FIG. 10, the ring 57 has diametrally opposite swingable member 56 and hinge mechanism 58, the mechanism 58 having a fixture 59 secured to the inner surface of the cover unit 50 and the swingable member 56 having a connecting tag 60.

From a rear inner vertical portion of the cover unit 50, a guide cylinder 61 protrudes to an upper interior of the shaver case unit 43 and a guide cylinder 62 protrudes to a lower interior of the shaver case unit 43, and these guide cylinders slidably support a switch operating lever 63. The operating lever 63 is urged upwards by means of a spring 64 and it has, at its upper end, a bent connector 65 coupled to the connecting tag 60 of the swingable member 56 by being passed upwards through a connection opening formed in the connecting tag 60, whereby the ring 57 can be held horizontally by a resilient force of the spring 64 and the urging pawls can be brought into engagement with the upper surface of the ring 57 when the openable lid 53 is closed as shown in FIG. 8.

In the base frame unit 31, there are provided an actuator 66 engaging the lower end of the switch operating lever 63 and a push-up spring 69 interposed between the actuator 66 and a tag 68 extending from the switch case 35. The actuator 66 has a cam 67 operative to push the button 35 of switch 33 when the actuator 66 is forced to lower in opposition to the push-up spring 69.

In this embodiment, when the feed port 52 of cover unit 50 confronting the upper opening of the hopper 49 is merely closed with the openable lid 53, the urging pawls 55 merely engage the ring 57 and will not push it down, as shown in FIG. 8. Only when the lid 53 is depressed as shown in FIG. 9, the urging pawls 55 are permitted to push down the ring 57 with the result that the swingable member 56 can be swung by the aid of the hinge mechanism 58 to cause the connecting tag 60 coupled to the lower end of the swingable member 56 to push down the switch operating lever 63 and actuator 66. This causes the cam 67 to push the button 35 of switch 33 to thereby close the drive circuit for the motor 32. The motor 32 is then started and the drive shaft 40 interlocked with the motor 32 begins to rotate the rotary blade unit 45 charged with ice blocks. By releasing the depression of the openable lid 53, the switch 33 can be turned off to stop the motor 32.

It will be appreciated from the foregoing description that in the second embodiment the switch 33 is turned on by depressing the openable lid 53 manually, for example, and the switch 33 is automatically turned off by releasing the depression to stop the motor 32 and associated rotary members. Therefore, with the lid 53 opened, the associated rotary members keep stopping and even if the feed port 52 is inadvertently accessed by hand while the openable lid 53 is kept opened, the rotary members never do the user an injury.

Figure 12:
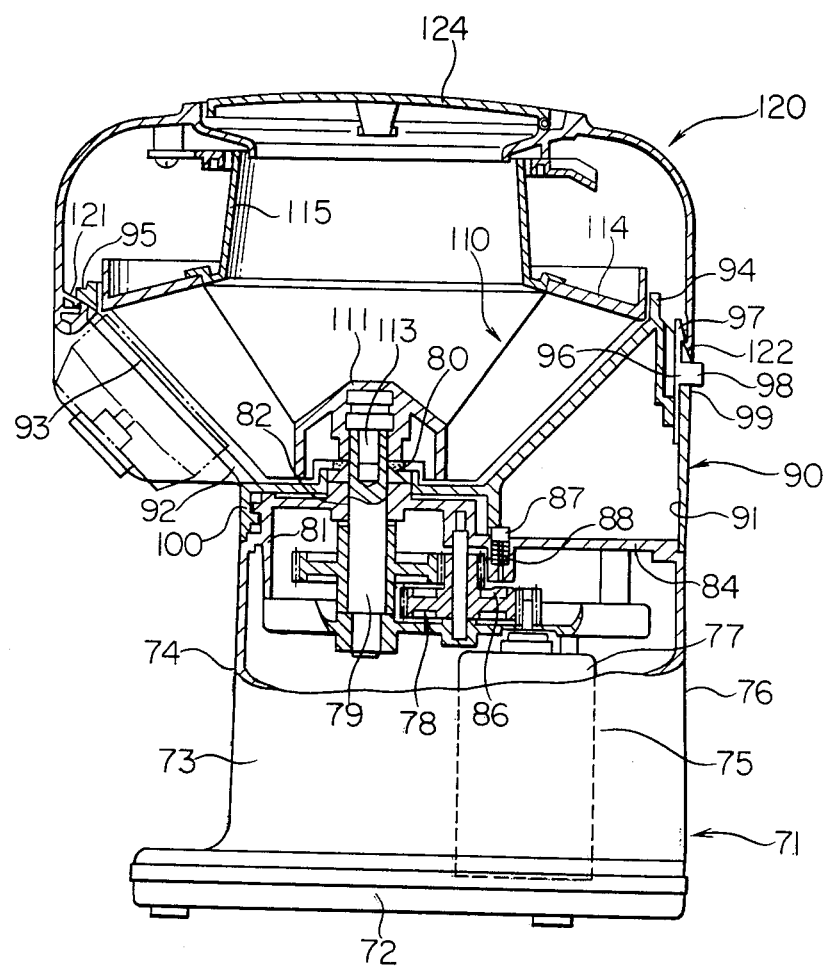
FIG. 12 is a front view, partly exploded, showing the FIG. 11 embodiment as assembled.
Figure 13:
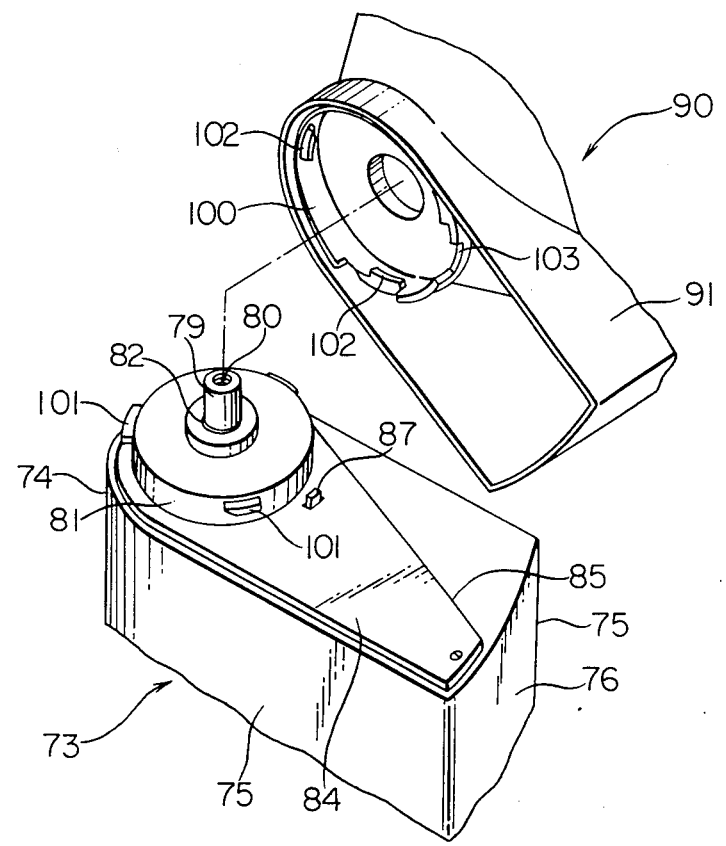
FIG. 13 is an exploded perspective view showing a part of the FIG. 11 embodiment.
Figure 14A:
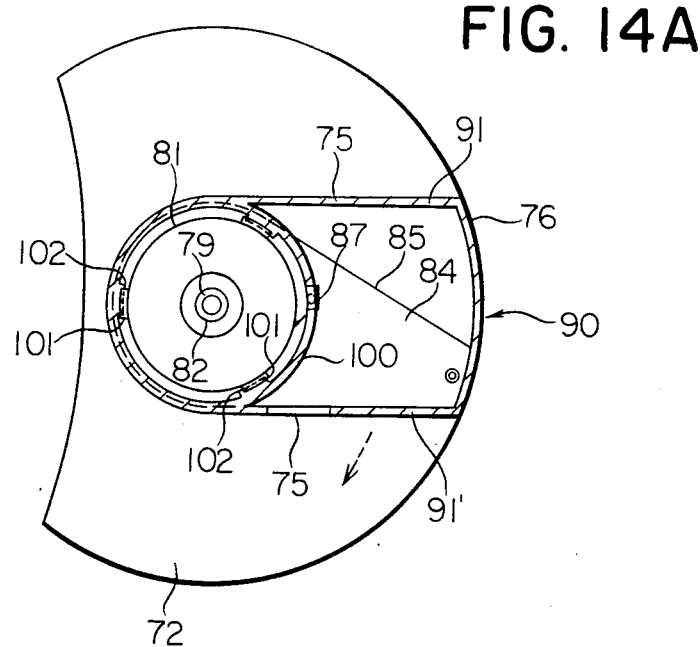
FIG. 14A is a plan view, partly crosssectioned, showing the FIG. 13 part as assembled.
Figure 14B:
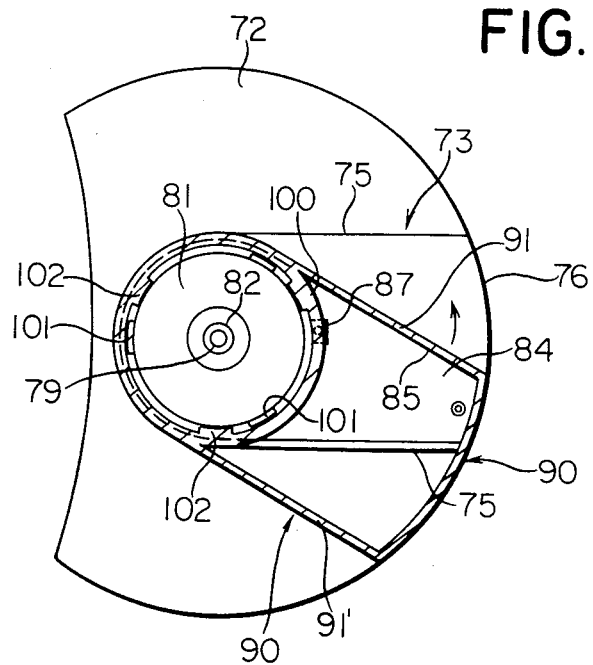
FIG. 14B is a similar plan view showing the FIG. 14A part with a shaver case unit displaced.
Figure 15:
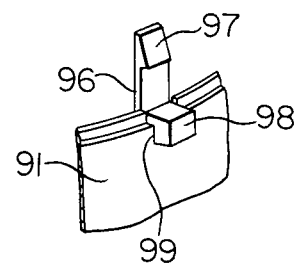
FIG. 15 is a fragmentary perspective view showing a drive mechanism of the FIG. 11 embodiment.

Turning to FIGS. 11 to 17, a third embodiment of the invention will be described wherein a base frame unit 71 has a base 72 which is contoured by a rear circular periphery and a front arcuate periphery of a large radius of curvature as best seen in FIGS. 14A and 14B, and a box-like casing 73 mounted on the base 72. The casing 73 has a front top portion formed with a hole 82 through which a drive shaft 79 passes, a front wall 74 of a semicircular shape centered on the hole 82, parallel opposite side walls 75 contiguous to the semicircular front wall, and a rear wall 76 which is arcuate in register with the base 72. A motor 77 placed inside the casing 73 as shown in FIG. 12 drives the drive shaft 79 through an intermediate gear 78 comprised of integral large-diameter and small-diameter gears. The drive shaft 79 passes through the hole 82 which is formed in the center of an upwardly raised circular support seat 81. The upper end of the drive shaft 79 is formed with a central threaded hole 80. As best been in FIG. 13, a ruler plate 84 is fixed to the top of the base frame unit 71. The ruler plate 84, slightly smaller than a top surface area of the base frame unit 71, surrounds the support seat 81 and has a slanting side 85 on the right (as viewed from above).

Figure 16:
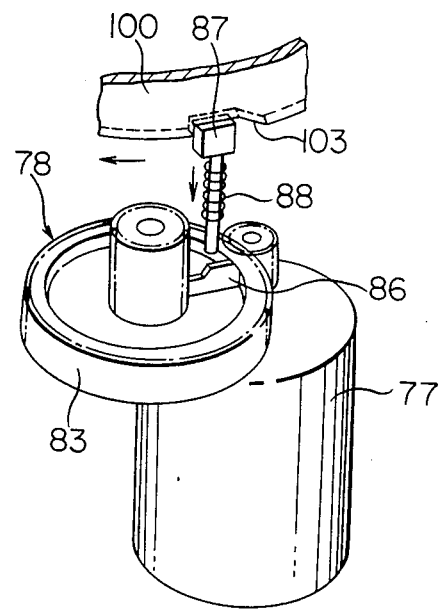
FIG. 16 is a perspective view showing a part of the FIG. 11 embodiment.

As shown in FIG. 16, the large-diameter gear, as designated at 83, of the intermediate gear 78 is integrally provided, at its upper surface, with a radial stopper 86 and a click member 87 is slidably mounted on the side wall of the support seat 81 of base frame unit 71, as best seen in FIGS. 12 and 16. The click 87 is biased by a spring 88 so as to protrude beyond the top of the base frame unit 71, as shown in FIG. 13. When a protruding portion of the click 87 is depressed in opposition to the spring 88, the lower end of the click member 87 abuts against the stopper 86. As best seen in FIG. 13, lugs 101 are formed on the outer circumferential surface of the support seat 81 at three angular positions.

A shaver case unit 90 has an inverted frusto-conical member which is opened downwards with its side, rear and front lower portions surrounded by a peripheral wall 91 of the same sectional configuration as that of the casing 73 of the base frame unit 71, as indicated in FIG. 13. The shaver case unit 90 has an upper front shaved ice piece discharge port 92 to which a shaving blade 93 sits opposite by slightly protruding into the unit 90. A circumferential edge plate 94 formed on the upper circumferential edge of the unit 71 has, at its front, a downward lug 95. The peripheral wall 91 has, at its rear portion diametrically opposite to or 180° spaced from the lug 95, a cutting 99 (FIG. 15) and a lock member 96 secured to the inner surface of the wall 91 has a pusher 98 passing through the cutting 99 to protrude beyond the wall 91. The lock member 96 has, at its upper end, an outwardly downwardly directing latch 97 which can be retreated inwards, as necessary, by manipulating the pusher 98.

Inside the peripheral wall 91, there is provided a cylindrical skirt 100 which surrounds the support seat 81 of the base frame unit 71. The skirt 100 has, on its inner circumferential surface, engaging members 102 for engaging the lugs 101 on the support seat 81 of base frame unit 71, and a cam 103 formed on the lower edge of the skirt 100, the cam 103 being operative to push down the click member 87 in opposition to a resilient force of the spring 88 when the peripheral wall 91 is turned clockwise.

A rotary blade unit 110 with a plurality of blades radially extending from a center boss 111 is rotatable within the shaver case unit 90 and has an annular connecting member 114 for interconnecting upper ends of the blades. Embedded in the boss 111 is a threaded rod 113 which extends downwards to make meshing engagement with the threaded hole 80 formed in the upper end of the drive shaft 79 protruding into the shaver case unit 90. A cylindrical hopper 115, though slightly converging upwards, is mounted on the annular connecting member 114.

A cover unit 120 is configured to cover an upper portion of shaver case unit 90 and the hopper 115 and has a lug 121 which engages, from below, the lug 95 and a latch 122 which latches the latch 97 of the lock member 96. An opening in the top of the cover unit 120 is covered with an openable lid 124 pivotally mounted thereon.

In putting together the units of this embodiment, the skirt 100 of the shaver case unit 90 is loosely fitted on the support seat 81 of casing 73 of the base frame unit 71, as shown in FIG. 14B and the shaver case unit 90 is mounted on the casing 73 of base frame unit 71 by abutting a lower inner edge of one side of the peripheral wall 91 against the slanting side 85 of the ruler plate 84. Thereafter, the shaver case unit 90 is turned counter-clockwise as indicated by solid arrow while being depressed slightly. Then, the engaging members 102 on the inner circumferential surface of the skirt 100 engage bottoms of the lugs 101 on the support seat 81 and a lower inner edge of the other side 91' of the peripheral wall 91 abuts against the other side, not slanting, of the ruler plate 84, thus completing rigid connection of these units 71 and 90 (FIG. 14A). To mount the rotary blade unit 110 into the shaver case unit 90, the threaded rod 113 embedded in the boss 111 of the blade unit 110 is screwed into the threaded hole 80 in the upper end of the drive shaft 79 protruding into the case unit 90.

Finally, to mount the cover unit 120 to the shaver case unit 90, the front lug 95 of the case unit 90 is engaged with the lug 121 and thereafter a rear portion of the cover unit 120 is depressed, so that the latch 97 is pushed by the latch 122 to temporarily retreat inwards and it subsequently recovers its original position to make intimate contact with the latch 122, thus completing secure connection of these units 90 and 120.

In disassembling the thus assembled ice shaver, the cover unit 120 can first be removed from the shaver case unit 90 by depressing the pusher 98 to disengage the latch 97 from the latch 122, and raising the rear portion of the cover unit 120 and then displacing the cover unit 120 frontwards to disengage the lug 121 from the lug 95.

Then, to remove the rotary blade unit 110 from the shaver case unit 90, the shaver case unit 90 is first turned clockwise as indicated by arrow in FIG. 14A so as to be moved to the position as shown in FIG. 14B. By this movement, the cam 103 shown in FIG. 16 of the skirt 100 of shaver case unit 90 is forced to depress the click member 87 of the base frame unit 71 and consequently the lower end of the click member 87 is lowered to abut against the stopper 86 of the intermediate gear 78 to hereby inhibiting the intermediate gear and accordingly the drive shaft 79 from rotating. This permits the rotary blade unit 110 to be turned in a direction in which the threaded rod 113 can be separated from the threaded hole 80 and as a result, the rotary blade unit 110 can be removed from the shaver case unit 90.

When the shaver case unit 90 takes the position shown in FIG. 14B, the engagement of the engaging member 102 with the lugs 101 is also released and the shaver case unit 90 can be removed from the base frame unit 71.

It should be appreciated from the foregoing that the independent or separate base frame unit 71, shaver case unit 90, rotary blade unit 110 and cover unit 120 can easily be assembled or disassembled for required cleaning by an inexpert user without using special tools.

What is claimed is:

1. A domestic ice shaver comprising:
   a box-like base frame unit having a top surface beyond which a drive shaft rotated by a built-in motor protrudes;
   a shaver case unit mounted on said base frame unit and having a shaved ice piece discharge port to which a shaving blade faces;
   a rotary blade unit fixed to the upper end of said drive shaft within said shaver case unit and having, on its top, a cylindrical hopper; and
   a cover unit mounted to said shaver case unit to cover an upper portion thereof and having a central openable lid, wherein there are provided an adjusting screw and on an outer surface of said shaver case unit a shaving blade support disposed adjacent said shaved ice piece discharge port and having a threaded hole for the adjusting screw, and there is provided an engaging projection strip disposed adjacent said shaving blade support and having an engaging recess formed in its top, and a shaving blade block is provided which has a front edge portion mounted with the shaving blade and an opening through which the adjusting screw passes so as to be screwed into said threaded hole, said shaving blade block having grooves and a tag which are respectively fitted on said engaging projection strip and fitted in said engaging recess when said adjusting screw is tightened, and said shaving block having a spring member interposed between a front bottom surface of said shaving blade block and an outer surface of said shaving block support for outwardly urging said shaving blade block.

2. A domestic ice shaver according to claim 1 wherein said spring member comprises a substantially straightforward connecting portion, resilient legs extending substantially perpendicularly from opposite ends of said connecting portion, and engaging legs extending outward from ends of said resilient legs in substantially parallel relationship with said connecting portion, said shaving block has a projecting edge having opposite side portions having holes therein, said engaging legs are fitted in said holes in said opposite side portions, said shaving blade support includes a boss, and said connecting portion rests on said boss.

3. A domestic ice shaver according to claim 1 wherein said cover unit has an inner vertical portion and an inner surface, and which includes a second spring member, a swingable device having a ring having an upper surface, and having a free end and surrounding the outer circumferential periphery of said hopper, a hinge mechanism for mounting the swingable device to the inner surface of said cover unit, an openable lid having an inner circumferential edge and pivotally mounted to said cover unit, and wherein urging pawls extending vertically from the inner circumferential edge of said openable lid which is pivotally mounted to said cover unit engage, at their lower ends, said upper surface of said ring, a switch operating lever normally biased upwards by said second spring member and having an upper end engaging the free end of said swingable device is vertically mounted to said inner vertical portion of said cover unit, so that when said openable lid remaining closed is manually depressed by hand, said switch operating lever is lowered by said swingable device to turn on a switch for a motor.

4. A domestic ice shaver according to claim 1 which includes a drive shaft having an upper end having a threaded hole therein and a threaded rod, wherein said base frame unit, shaver case unit, rotary blade unit and cover unit are structurally independent of each other and wherein said base frame unit has a circular support seat which is concentric with said drive shaft and which is provided, on its outer circumferential surface, with a plurality of lugs, said shaver case unit has a skirt which is concentric with said drive shaft and which surrounds said support seat, the inner circumferential surface of said skirt being provided with the same number of outwardly extending engaging members as said lugs which are brought into engagement with said lugs when said shaver case unit is turned, said shaver case unit further having, at an upper front peripheral edge, a lug and at a rear portion a deflectable latch, said rotary blade unit has a boss in which said threaded rod for meshing engagement with said threaded hole in the upper end of said drive shaft is vertically embedded, and said cover unit has, at a lower circumferential edge, a lug and a latch which are engageable with said lug and latch of said shaver case unit.

5. A domestic ice shaver according to claim 9 which includes a spring and includes a stopper carried on a gear wherein a cam is formed on a lower edge of said skirt, an opening is formed in said base frame unit on a path of movement of said cam, and a click biased upwards by said spring is vertically movably supported in said opening, so that when an upper end of said click engages said cam so as to be lowered, a lower end of said click abuts against said stopper carried on said gear for driving said drive shaft disposed within said base frame unit.

6. A domestic ice shaver according to claim 5 wherein said base frame unit comprises a box-like casing having a front wall of a semicircular shape centered on said support seat, parallel opposite two side walls contiguous to said front wall and having rear ends, and a rear wall bridging said rear ends of said two side walls, and said shaver case unit comprises a peripheral wall being contiguous to said skirt and resembling said two side walls and rear wall of said box-like casing, said peripheral wall being carried, through a lower opening thereof, on said casing, said casing having a raised ruler which is contiguous to said support seat and which has a slanting side extending outwards between said two side walls.

* * * * *

UNITED STATES PATENT AND TRADEMARK OFFICE
CERTIFICATE OF CORRECTION

PATENT NO. : 4,767,068

DATED : August 30, 1988

INVENTOR(S) : Toshio Ando

It is certified that error appears in the above-identified patent and that said Letters Patent is hereby corrected as shown below:

Column 1, line 43, "reguired" should read --required--.

Column 1, line 68, "dischange" should read --discharge--.

Column 5, line 16, "stripe" should read --strip--.

Column 7, line 57, "been" should read --seen--.

Column 8, line 37, "boss 1" should read --boss 111--.

Column 10, line 67, "9" should read --4--.

Signed and Sealed this

Fourth Day of April, 1989

Attest:

DONALD J. QUIGG

*Attesting Officer*  *Commissioner of Patents and Trademarks*